J. B. POWELL & S. H. EVERETT.
GATE.
No. 66,171. Patented June 25, 1867.
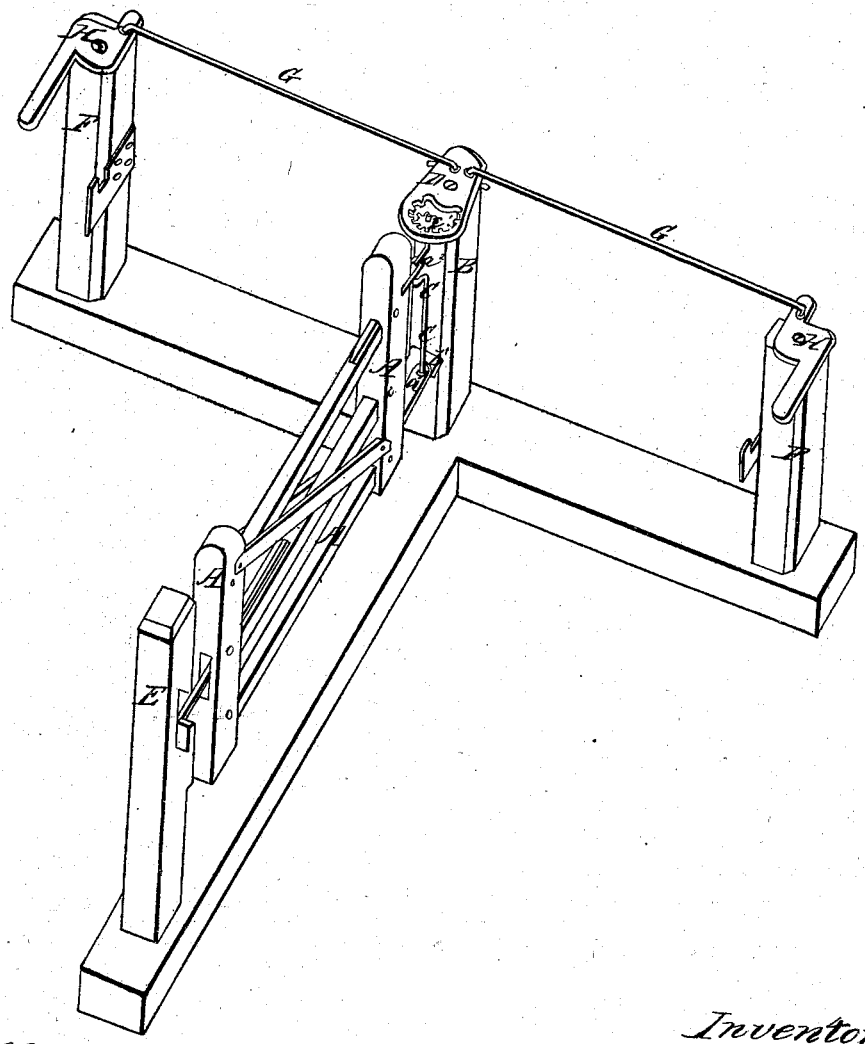

United States Patent Office.

J. B. POWELL AND S. H. EVERETT, OF MACEDON, NEW YORK.

Letters Patent No. 66,171, dated June 25, 1867.

IMPROVEMENT IN GATES.

The Schedule referred to in these Letters Patent and making part of the same.

TO ALL WHOM IT MAY CONCERN:

Be it known that we, J. B. POWELL and S. H. EVERETT, of Macedon, in the county of Wayne, and State of New York, have invented a new and useful Improvement in Gate; and we do hereby declare that the following is a full, clear, and exact description thereof, which will enable others skilled in the art to make and use the same, reference being had to the accompanying drawing, forming part of this specification.

The figure is a perspective view of our improved gate.

Our invention has for its object to furnish an improved gate, so constructed and arranged that it may be opened and closed by the driver without getting out of the carriage; and it consists in the combination of the rod to which the gate is pivoted, having a crank formed upon it, and a pinion-wheel attached to its upper end, the pivoted lever-plate, connecting-rods, and operating levers with each other, and with the gate and posts, the whole being constructed and arranged as hereinafter more fully described.

A is the gate, about the construction of which there is nothing new. B is the rear gate-post, to which the gate is pivoted by means of the rod C, the lower end of which is pivoted to a support, $b'$, attached to the post B in such a position that the lower gate-hinge $a^1$ may rest upon it. The upper part of the rod C has a crank formed upon it, to the arm of which the upper gate-hinge $a^2$ is pivoted, the length of the upper hinge and of the crank together being equal to the length of the lower hinge, so that the gate may stand and swing level. To the upper end of the rod C is attached a pinion-wheel, $c'$, the teeth of which mesh into the teeth formed in the side of the circular slot or opening in the plate D, which is pivoted to the upper end of the post B, so that as the forward end of the plate D is moved to one side the rod C will be partially revolved, turning the crank to which the upper gate-hinge is pivoted to the same side. The effect of this is to raise the forward end of the gate, freeing the latch from the catch in the forward gate-post E, and at the same time to move the upper part of the rear end of the gate to one side, so that the gate may swing around until it latches upon one or the other of the side-posts F. To the rear end of the pivoted plate D are pivoted the ends of the connecting-rods G, the other ends of which are pivoted to the short arms of the levers H pivoted to the tops of the posts F, and the long arms of which extend out into such a position as to be readily reached and operated by the driver without getting out of the carriage.

By this construction and arrangement the driver can operate the lever H upon whichever side of the gate he may be, and cause the gate to swing from him, and, after passing through, by operating the other lever, he can close the gate behind him.

We claim as new, and desire to secure by Letters Patent—

The combination of the pivoting rod C, having a crank formed upon its upper part, and a pinion-wheel, $c'$, attached to its upper end, the toothed and pivoted plate D, connecting-rods G, and operating levers H, with each other, with the gate A and posts B and F, substantially as herein shown and described, and for the purpose set forth.

J. B. POWELL,
S. H. EVERETT.

Witnesses:
WM. H. SOUTHWICK,
J. CHADWICK.